United States Patent
Hartmann et al.

(10) Patent No.: US 7,366,591 B2
(45) Date of Patent: Apr. 29, 2008

(54) SYSTEM AND METHOD FOR VERTICAL FLIGHT PLANNING

(75) Inventors: Gary L. Hartmann, Fridley, MN (US); Michael R. Jackson, Maple Grove, MN (US); Brian E. O'Laughlin, Phoenix, AZ (US); Richard J. Snyder, Phoenix, AZ (US); Rosa N. Weber, San Diego, CA (US)

(73) Assignee: Honeywell International, Inc., Morristown, NJ (US)

( * ) Notice: Subject to any disclaimer, the term of this patent is extended or adjusted under 35 U.S.C. 154(b) by 758 days.

(21) Appl. No.: 10/871,668

(22) Filed: Jun. 21, 2004

(65) Prior Publication Data

US 2005/0283281 A1 Dec. 22, 2005

(51) Int. Cl.
*G05D 1/00* (2006.01)

(52) U.S. Cl. ............................. 701/4; 701/14; 340/945

(58) Field of Classification Search .................... 701/1, 701/3–7, 14, 123; 340/933–964, 29, 33; 73/1.78; 342/29, 33
See application file for complete search history.

(56) References Cited

U.S. PATENT DOCUMENTS 5,121,325 A * 6/1992 DeJonge ..................... 701/123
5,337,982 A 8/1994 Sherry
5,442,556 A 8/1995 Boyes et al.
6,163,743 A 12/2000 Bomans et al.
6,507,782 B1 * 1/2003 Rumbo et al. .............. 701/121
2003/0058134 A1 3/2003 Sherry et al.
2003/0093219 A1 5/2003 Schultz et al.

FOREIGN PATENT DOCUMENTS

FR 2689231 10/1993

* cited by examiner

*Primary Examiner*—Yonel Beaulieu
(74) *Attorney, Agent, or Firm*—Ingrassia Fisher & Lorenz

(57) ABSTRACT

A method for performing performance prediction with respect to a vertical flight plan. A system performs performance prediction with respect to a vertical flight plan of an aircraft that includes determining which vertical flight plan rules of a plurality of vertical flight rules that have been loaded in a predictions processor are active by monitoring for criteria that are used to initiate or terminate one or more of the vertical flight plan rules. Aircraft state is predicted at waypoints along a lateral flight path in view of active vertical flight plan rules, and the predicted aircraft state is updated within an integrated flight plan database that stores prediction performance data associated with the aircraft's flight.

30 Claims, 10 Drawing Sheets

SYSTEM AND METHOD FOR VERTICAL FLIGHT PLANNING

BACKGROUND

1. Field of the Invention

The present invention relates generally to navigation control systems for aircraft. More specifically the present invention relates to a vertical flight planning and management system for use with aircraft.

2. Background of the Invention

The performance prediction function in a flight management system (FMS) uses equations of motion, aerodynamic and engine characteristics to simulate an intended flight plan. Using available data, the flight trajectory is computed from origin through destination. This flight plan must not, for example, violate any speed or altitude constraints or other such restrictions imposed by the Federal Aviation Administration (FAA), airline policies, or pilot entries. In well-known FMSs, computed waypoint arrival times and fuel status may be displayed to the pilot as an aid in evaluating various route options, monitoring progress, contingency planning, etc.

An FMS performs the task of flight planning by compiling a four-dimensional route, defined by a lateral flight plan (i.e., two of the four dimensions), a vertical flight plan and an elapsed time trajectory. These flight plans are compiled from stored navigation databases and flight-crew entries. The FMS performs the task of navigation by identifying aircraft position relative to fixed points on the surface of the earth. A lateral position, vertical position and elapsed time are computed by a combination of data from ground-based transponder radios, Global Positioning System, and aircraft motion sensors. The FMS performs the task of guidance by determining the appropriate altitude, speed, thrust, and heading required to fly the current leg of the flight plan. These targets are determined by a comparison of aircraft position (navigation) to the desired profile (flight planning) and may take into account temporary deviations from the flight plan due to weather, traffic, equipment failure or on-board emergencies. The autopilot controls pitch, roll, and yaw control surfaces and the throttle position, to instantaneously maintain the desired aircraft trajectory defined by FMS guidance.

Currently, with a traditional FMS, the vertical flight plan follows a fixed sequence of flight phases including: takeoff, climb, cruise (which may include one or more step climbs), descent (which may include options for early or late descent), and approach (which may include an optional "go around" for a missed approach). These discrete phases are shown in FIG. 1. A pilot usually enters specific vertical flight plan parameters associated with this fixed sequence, such as climb, cruise, and descent airspeeds, and cruise altitude.

FIG. 2 depicts the classic method of performing calculations for an existing vertical trajectory model in an existing FMS. As can be readily appreciated, this series of calculations is tied to the notion of a fixed sequence of flight phases. The performance calculations review each of the various phases of the vertical flight plan (VFP) and check to ensure that flight is within the preset parameters. Calculations predict flight time and fuel consumption according to the flight plan. One problem with this structure is that any change or addition to the general structure of the vertical flight plan (e.g., multiple climb-cruise-descent phases) requires that all of the performance prediction logic be pulled apart and modified. Changes to the FMS in this manner have proven to be very time consuming and expensive. In addition, the resulting performance prediction function remains limited in the types of trajectories it is capable of supporting.

Thus, within a given flight phase, the possible trajectories that can be described are very constrained. For example, in cruise, a pilot must fly a fixed altitude segment. Although some systems allow for step climb capabilities, there are no trajectory parameters that can be entered by the pilot that would allow the user to fly, for example, a "cruise-climb" segment. As used herein, cruise-climb refers to continuously climbing as fuel is burned to achieve optimum efficiency. In the air traffic control (ATC) environment of the past, this was not as important because FAA controllers assigned aircraft to fly to a fixed altitude. However, in the evolving ATC environment, aircraft may receive block altitude clearances such that a cruise-climb segment could be part of a legal and approved vertical flight plan.

Also, as more user-preferred options become available, the vertical flight plans modeled within an FMS need to keep pace. Due to their current configuration, modifying the vertical flight plan alone within a comprehensive FMS is quite cumbersome and such modifications would be very difficult. The changes would affect several functional areas of the FMS resulting in high costs of development and re-certification.

BRIEF SUMMARY OF THE INVENTION

In view of the foregoing, it would be desirable to have a vertical flight plan that is separate from the performance prediction function and is easily modifiable so that, for example, liberalization of FAA regulations in regard to ATC can be more easily and quickly realized in an FMS.

According to one exemplary aspect, a method for performing performance prediction with respect to a vertical flight plan of an aircraft is provided that includes determining which vertical flight plan rules of a plurality of vertical flight rules that have been loaded in a predictions processor are active by monitoring for criteria that are used to initiate or terminate one or more of the vertical flight plan rules. Aircraft state is predicted at waypoints along a lateral flight path in view of active vertical flight plan rules, and the predicted aircraft state is updated within an integrated flight plan database that stores prediction performance data associated with the aircraft's flight.

According to another exemplary aspect, a method for performing performance prediction with respect to a vertical flight plan of an aircraft is provided that includes specifying a vertical flight plan comprising rules, the rules having associated initiation and termination criteria. The vertical flight plan is processed for specified state data to determine whether a rule is armed, on, or off, and future motion of the aircraft operating according to the vertical flight plan is predicted.

According to a further exemplary aspect, an aircraft is provided with a computer system to control the aircraft and an apparatus for generating commanded control modes. The apparatus includes means for specifying a vertical flight plan comprising rules for controlling aircraft operation with the rules having related initiation and termination criteria. Additionally, means for processing the vertical flight plan for specified state data to determine which rules are active are included as well as means for predicting future motion of the aircraft in accordance with the vertical flight plan.

These and other features of the present invention along with their attendant advantages will be more fully appreciated upon a reading of the following detailed description in conjunction with the associated drawings.

DETAILED DESCRIPTION OF THE INVENTION

Figure 1:
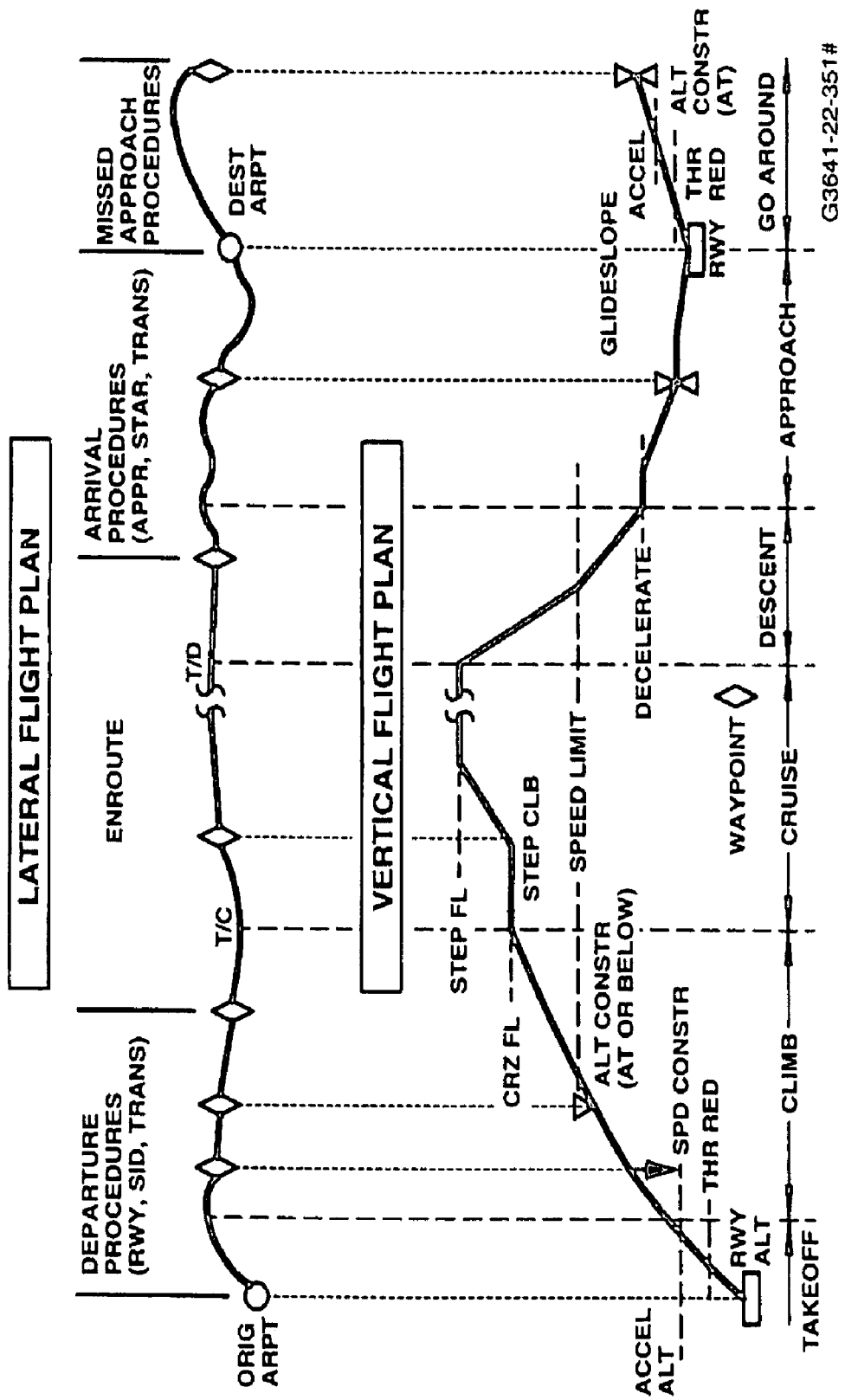
FIG. 1 is a graph depicting lateral and associated vertical flight plan according to the prior art.
Figure 2:
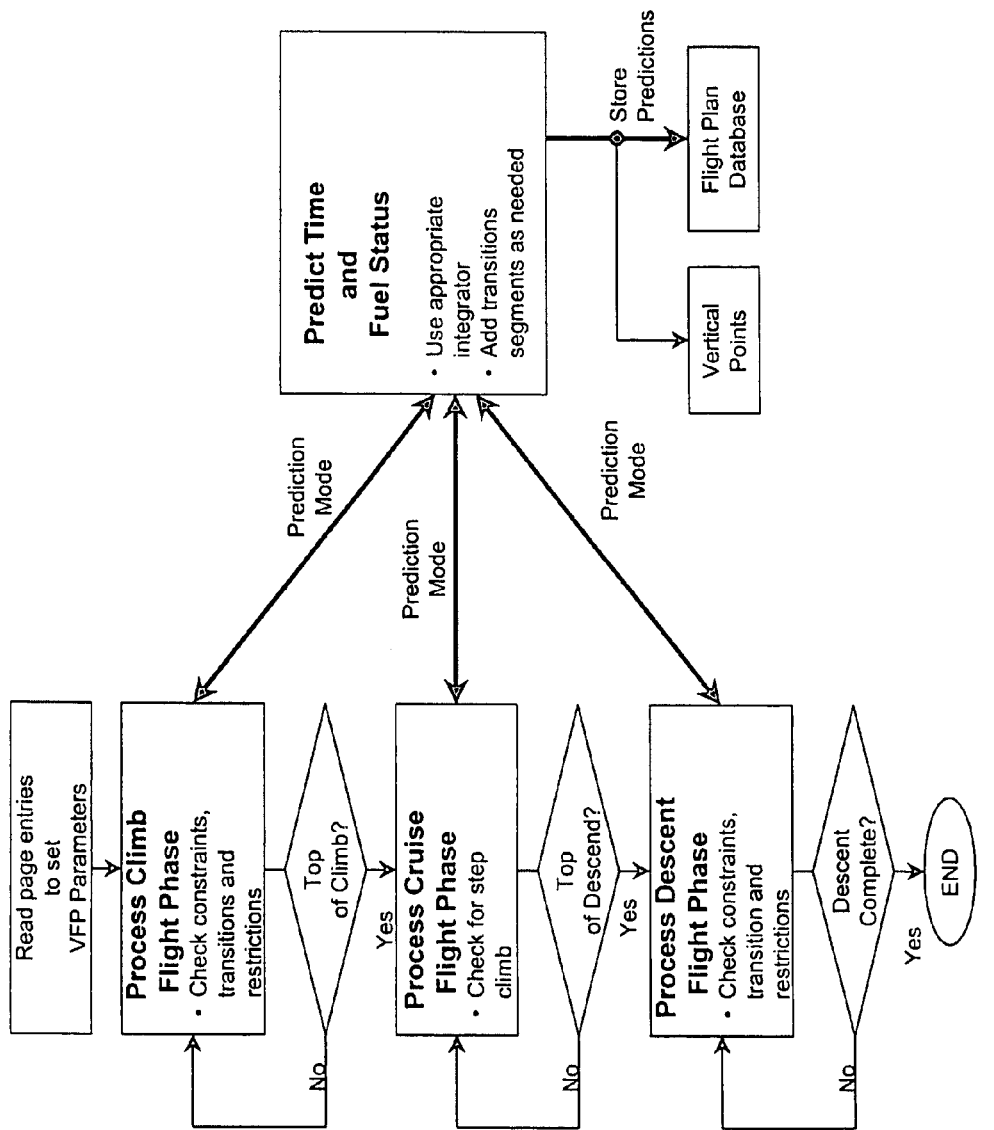
FIG. 2 is a flow chart corresponding to vertical trajectory modeling according to the prior art.
Figure 3:
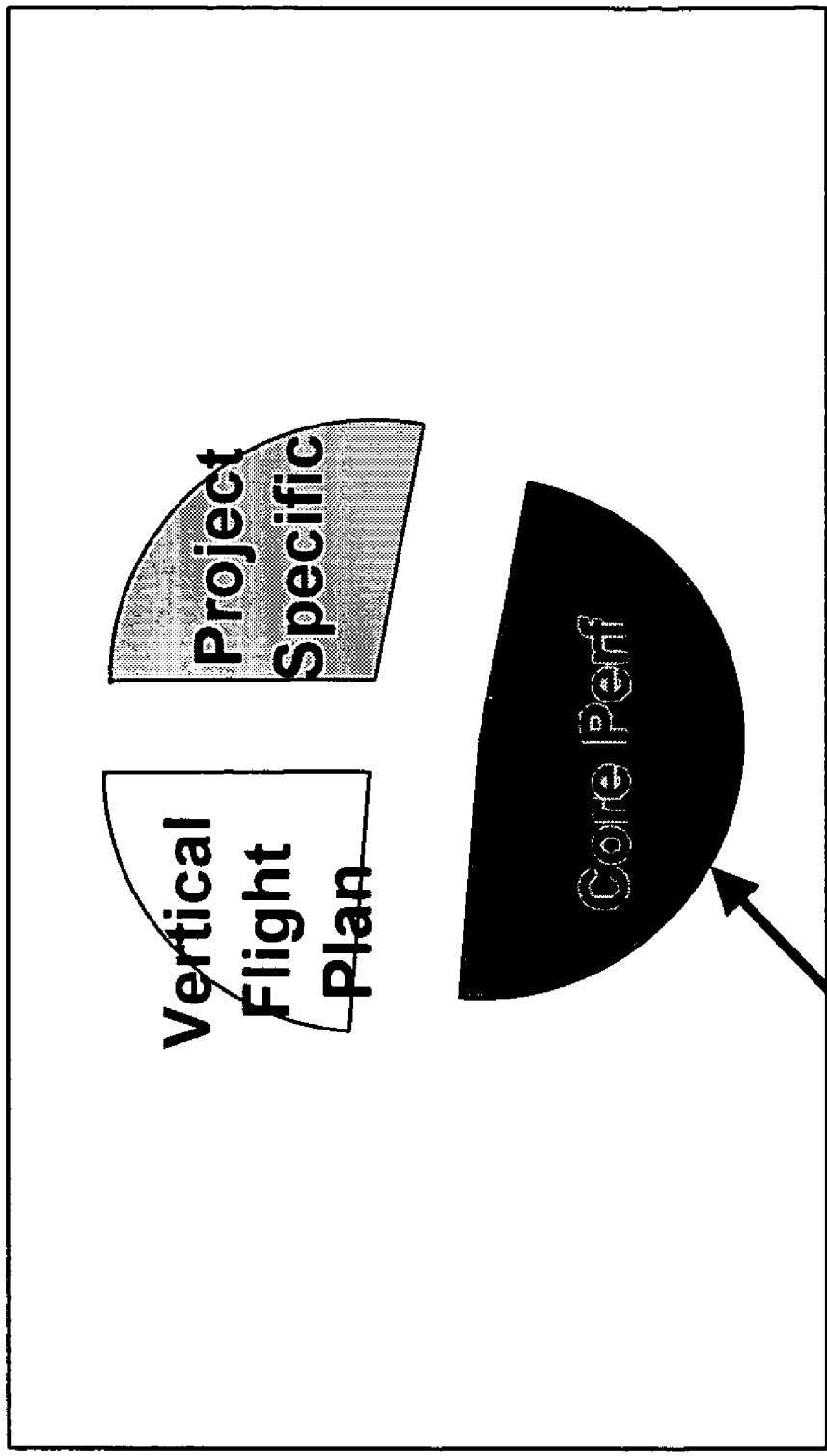
FIG. 3 shows how a vertical flight plan that is part of overall performance prediction is separated from core prediction functionality in accordance with the present invention.

The present invention will be described first with respect to FIG. 3. The vertical flight plan describes the vertical trajectory requirements of a flight. It defines how the aircraft will operate in the future. The vertical flight plan also describes how the performance predictions are to be performed. Conventionally, performance predictions with respect to the vertical flight plan are "hard-coded" in algorithms that implement trajectory predictions associated with lateral flight plans. In order for a core performance to exist with a trajectory system that is generic, the assumptions associated with the vertical aspects of the flight plan are, in accordance with the present invention, removed from the hard-coded algorithms and placed into a separate, modularized, vertical flight plan, as shown in FIG. 3. Accordingly, the vertical flight plan can be developed separately from the core performance prediction function, and the vertical flight plan can be modified and evolved to meet FAA or customer requirements without requiring difficult and expensive modification to the core performance prediction function. Additionally, project specific data, such as aircraft performance tables and economy speed schedules, can be separated from both the vertical flight plan and core performance predictions algorithms to minimize changes to these functions from aircraft to aircraft.

In addition to the cruise-climb maneuver previously mentioned, there are many other trajectories not currently supported by existing vertical plan structures. The following list is representative, but certainly not exhaustive of the types of modifications that, in accordance with the present invention, could be incorporated into a vertical flight plan. As the air traffic control environment moves toward allowing more and more user-defined trajectories, many new vertical flight plans will be of interest. Existing FMSs are simply not equipped to be easily modified to include new additions, such as:

A. Cruise-climb—continuously climbing as fuel is burned to achieve optimal efficiency.
B. Noise abatement procedures during take off—fly trajectories using specified derated thrust levels to specified altitude. Multiple altitudes with different thrust levels may be defined to meet noise abatement requirements as part of new take off procedures.
C. Multiple climb/cruise/descent segments—military transports and tankers fly special missions that do not fit conventional profiles. For example, military planes may have a descent segment to drop cargo or perform a search and rescue, followed by a climb segment back to cruise, followed by another descent for landing. Existing FMSs have such flight phases hard-coded, and cannot support a flexible, arbitrary series of general trajectory segments.
D. Multiple required time of arrival (RTA)—these constraints may be specified at any point in the flight and are used to reach specified waypoints at, before, or after specific times for managing traffic flow or to avoid crossing traffic.

Figure 4:
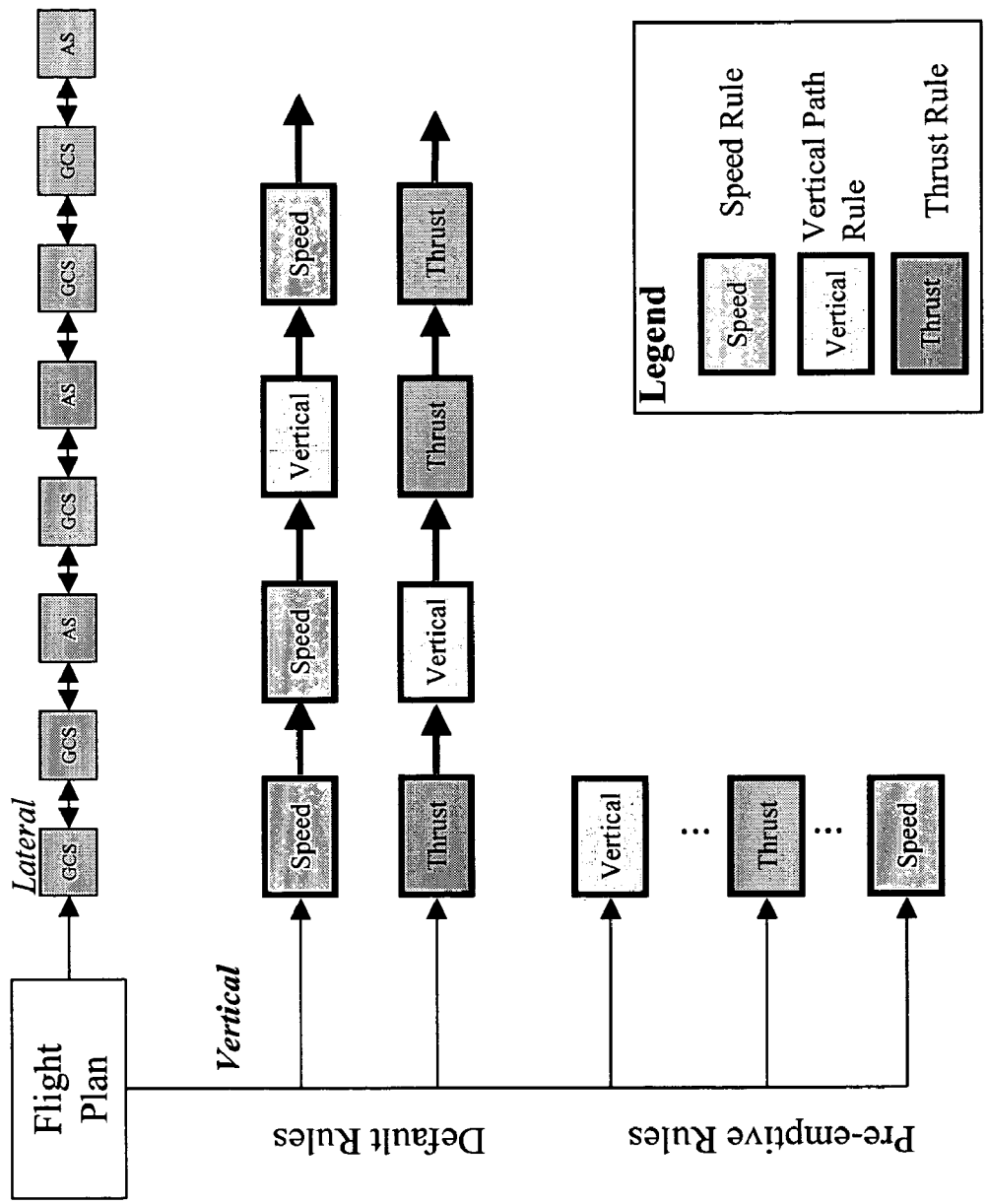
FIG. 4 illustrates how rules are used to implement a vertical flight plan in accordance with the present invention.

The vertical flight plan according to one exemplary embodiment of the present invention is not based on the notion of flight phase. Rather, the vertical flight plan preferably represents any series of climb, cruise, or descent behaviors in any arbitrary order. The desired behavior for each segment can be specified using a general construct of rules and criteria as opposed to setting a few parameters in an otherwise fixed plan. Generally, four types of rules are used (although, more or fewer types may be used), and each type may remain in effect for an entire flight or be initiated or terminated based on logic conditions. Preferably, rules relate at least to speed, vertical path, and thrust, as shown in FIG. 4, plus aircraft configuration rules such as flap and landing gear deployment, engine rating mode, and anti-ice mode. The logic conditions (criteria) may be very general and may be based on flight time or any state of the aircraft or its subsystems (e.g., speed, altitude, rate-of-climb, retracting flaps, etc.).

The vertical flight plan technique, shown in FIG. 4, differs significantly from the well-known lateral flight plan in at least one important sense: while the lateral flight plan can be described sequentially, the vertical flight plan mode sequence need (indeed, typically, cannot) not be known prior to executing performance predictions. Accordingly, the rules and criteria of the present invention are better suited to perform vertical flight planning.

More specifically, a rule specifies a controlled variable (e.g., speed, thrust, vertical path, etc.) and instructions of when that control is to take place (e.g., initiation and termination criteria). One example of such a rule could be that speed equals 190 knots CAS until 1,500 feet AGL. Preferably, a vertical flight plan has default (sequential) rules and preemptive (limit) rules. Rules can specify a default sequence of control actions, or commanded control modes, that occur one after another, for example, fly speed equals 290 knots CAS until speed equals 0.8 Mach, then fly speed equals 0.8 Mach. Alternatively, rules may be specified as limits that preempt the active target rules, for example, fly a speed equal to economy speed (table lookup on weight, etc.), but subject to a limit of speed less than or equal to 0.8 Mach. Rules also have initiation and termination criteria that describe when to turn them on and off.

Rules describe both the primary vertical modes (e.g., speed, vertical path, and thrust) and aircraft configuration changes (e.g., bleeds, flaps, landing gear, cargo drop, antennae deployment, engine rating mode, etc.). Criteria specify events that change the state of a rule or cause other discrete actions to occur.

A criterion may specify an event that changes the state of a rule or causes discrete action to occur. A criterion may further specify the state to which the rule should be changed. Sub-criteria related to a criterion describe logical conditions under which an event should occur. A criterion may also specify an additional rule to activate as well as an action to take when the criterion is met.

For instance, when a termination criterion is satisfied, the rule in which it resides is set to an OFF or ARMED state. Multiple criteria may be treated with a logical OR relationship—if any one of the multiple criteria is met, action is taken. Each sub-criterion defines a logical comparison that is made, such as speed <280 knots CAS, or altitude >20,000 feet. The sub-criteria specify which variable or variables are to be compared, a value or function against which to compare, and a comparison type (e.g., equal, less than, greater than, less than or equal, greater than or equal, etc.). Multiple sub-criteria linked to a single criterion may be treated with an AND relationship such that they must all be satisfied before action is taken.

Figure 5:
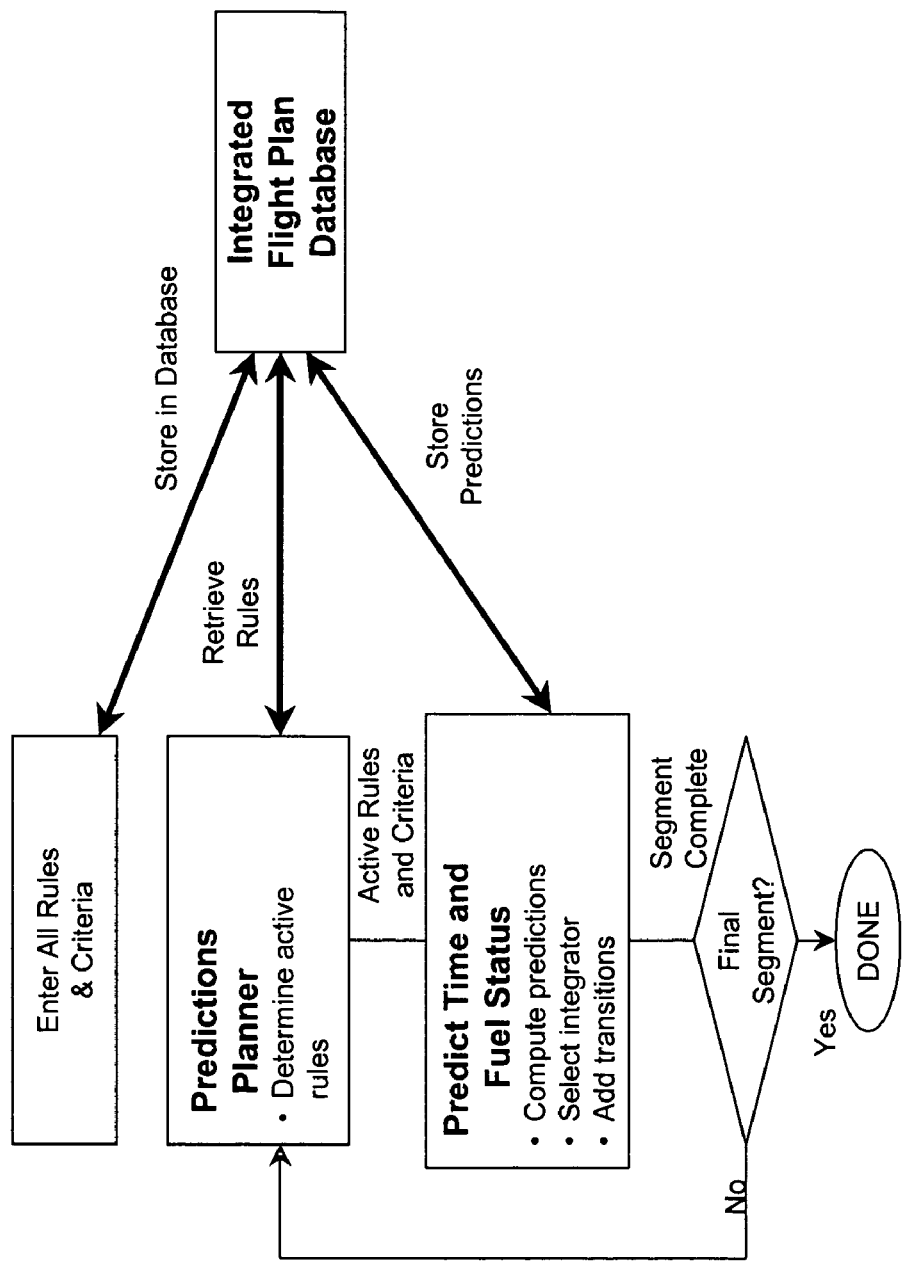
FIG. 5 illustrates prediction processing using vertical flight plan rules and criteria in accordance with the present invention.
Figure 5A:
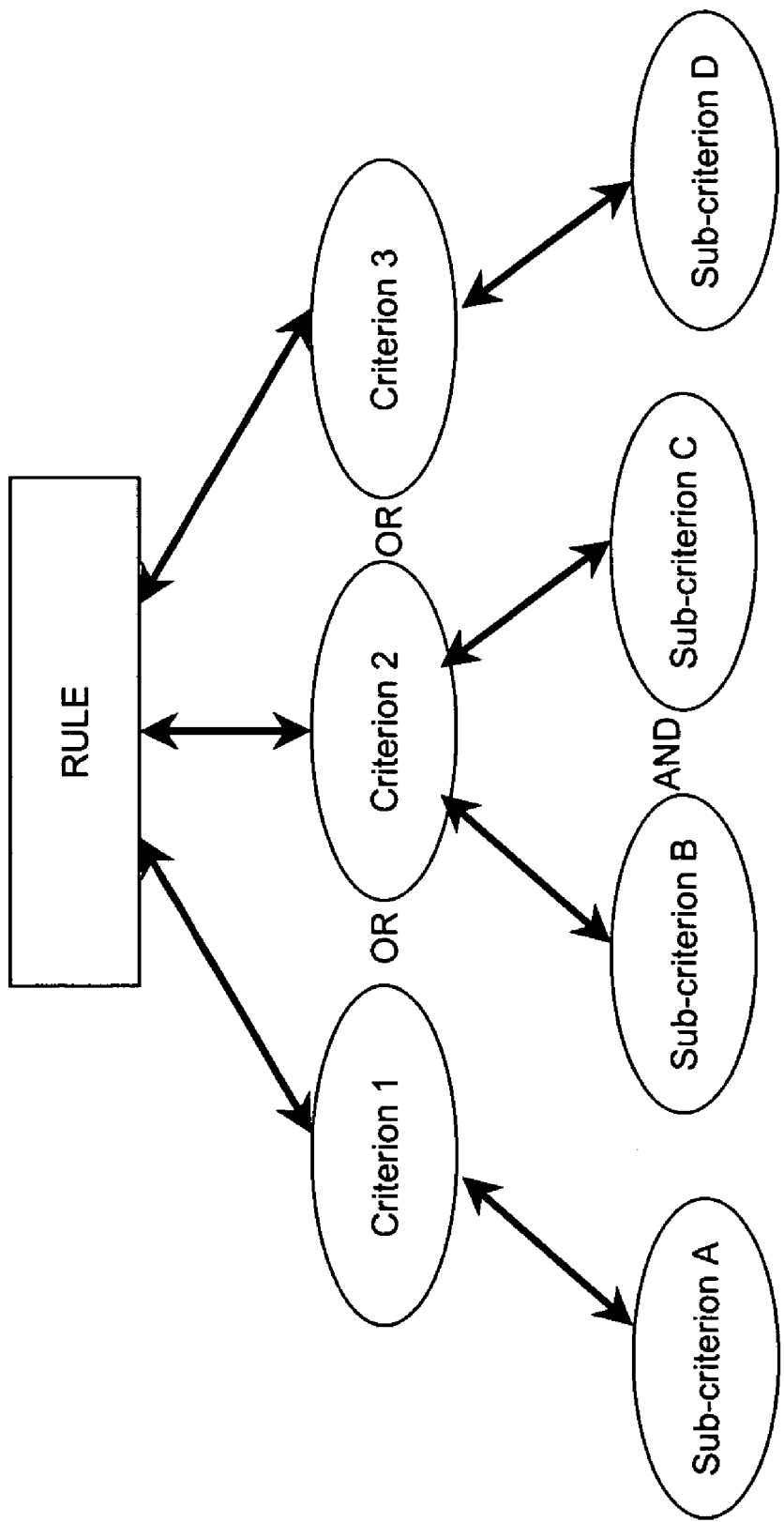
FIG. 5A illustrates how multiple criteria and sub-criteria may be linked using AND and OR relationships.

FIG. 5A shows an example of a rule with three termination criteria linked with an OR relationship. If any one of criteria 1, 2, or 3 is met, the rule is terminated. To determine whether a criterion is met, the associated sub-criterion or sub-criteria provide the aforementioned variable(s) for comparison. Each of Criterion 1 and Criterion 3 include further single sub-criteria (A and D, respectively). Criterion 2 has associated with it two sub-criteria, B and C connected with an AND relationship. In order for Criterion 2 to be satisfied, both sub-criteria A and B must be satisfied. Each criterion may have many sub-criteria linked to it and FIG. 5A should not be considered to suggest that only one or two sub-criteria may be associated with each criterion.

Although criteria may primarily be used to control when the rules turn on and off, criteria can also exist on their own in the VFP. A stand-alone criterion would not likely control anything continuously, but instead would wait for its conditions to be met and subsequently perform a discrete action. Examples include: scratchpad messages, Automatic Dependent Surveillance (ADS) messages, fix info data, cargo drop, etc. For example, an ADS request to output predicted aircraft state data (e.g. time, fuel, speed, altitude, distance, flight path angle) every fifteen minutes could be accommodated by a stand-alone criterion that calls a function to determine if an output is appropriate. This criterion would stay active even if it evaluates to true.

The rules and criteria mechanisms are preferably designed to be easily customizable. The numerical values used to specify rules and sub-criteria may be specified by constant values or by algorithms. Complex or project-specific algorithms for specifying control modes or event criteria may be handled by describing a project-specific algorithm in a callback function. A reference to the callback function is placed in the appropriate rule or criteria, so that the project-specific function will be called when the rule is active or the criterion is evaluated. Similarly, the project-specific actions may be described in a callback function. A reference to the callback function may be placed on a criterion and the project-specific function/action will be called when the criterion is met.

This new approach to addressing the vertical flight plan leads to a simpler algorithmic or computational structure as depicted in FIG. 5. In this new structure, a generalized flight plan may be integrated segment by segment. A predictions processor determines, for example, which of the speed rules, vertical path rules, or thrust rules apply during the current segment. If multiple rules are active, then the highest priority or most constraining rule is preferably used. The rules and termination criteria can model or represent existing vertical trajectories, but in addition, they can also accommodate the new trajectory options previously described as well as completely new or later developed options.

The output of the predictions processor is a set of active rules that tells the predictor the desired flight mode, and a set of criteria that tells the predictor when to stop. The predictor may then store the trajectory prediction results for access by other FMS subsystems.

Figure 6:
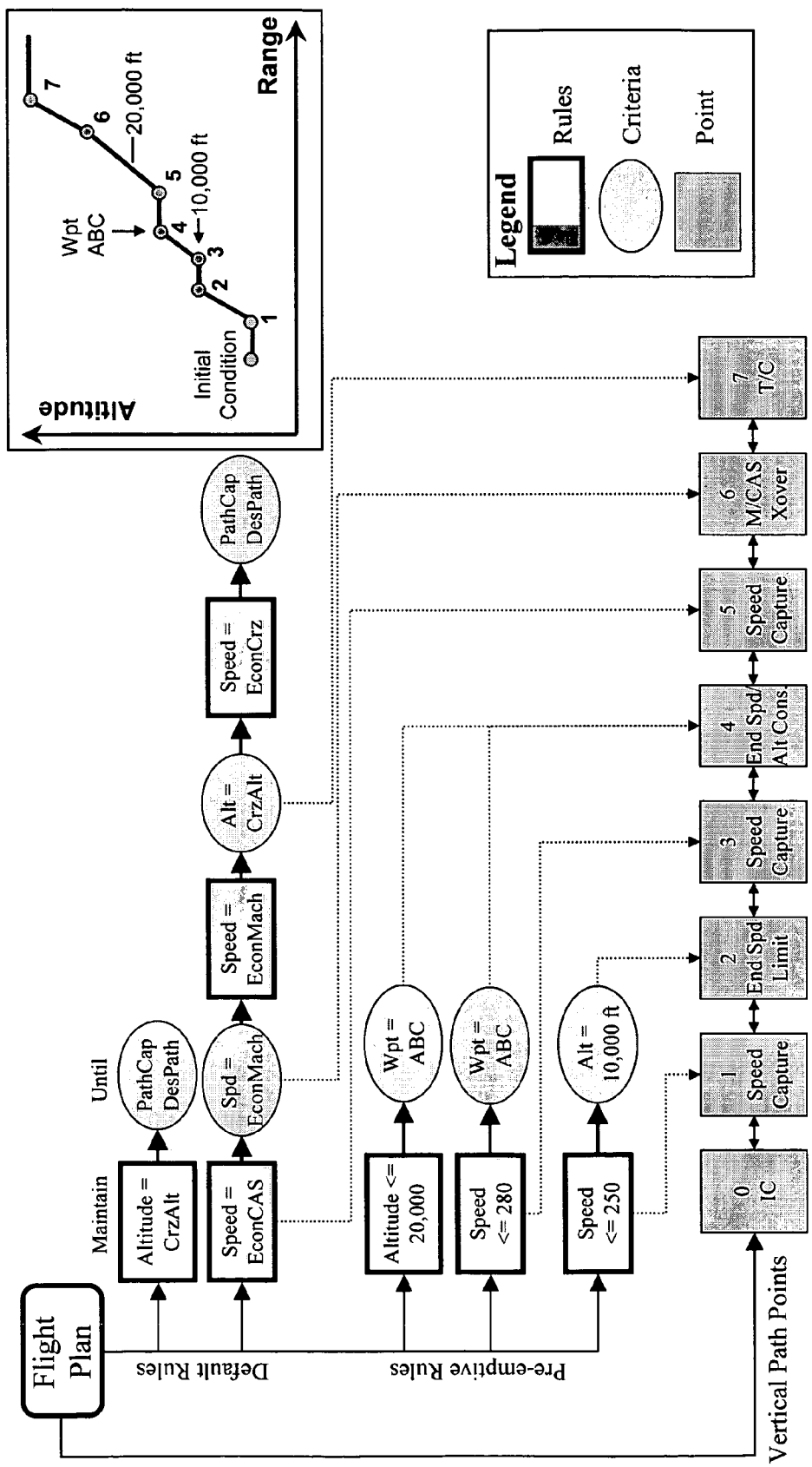
FIG. 6 illustrates an exemplary climb trajectory in accordance with the present invention.

FIG. 6 illustrates an exemplary climb trajectory in accordance with the present invention. As shown, a series of vertical path points 0-7 are set forth at the bottom of the figure and correspond to the several points on the altitude/range graph at the upper right of the figure. Beginning at initial condition (IC) 0, performance prediction is calculated based on the rules and criteria associated with each of those rules. For example, at vertical path point 4 it is determined that waypoint ABC has been attained and, accordingly, it is now possible to end speed and altitude constraints. By continuously examining, within the predictive tools, where an aircraft is with respect to its vertical flight plan and applying the appropriate rules based on their respective criteria, it is possible to uniquely and separately predict aircraft performance without complete reliance on the lateral flight plan or predetermined phases of flight.

Figure 7:
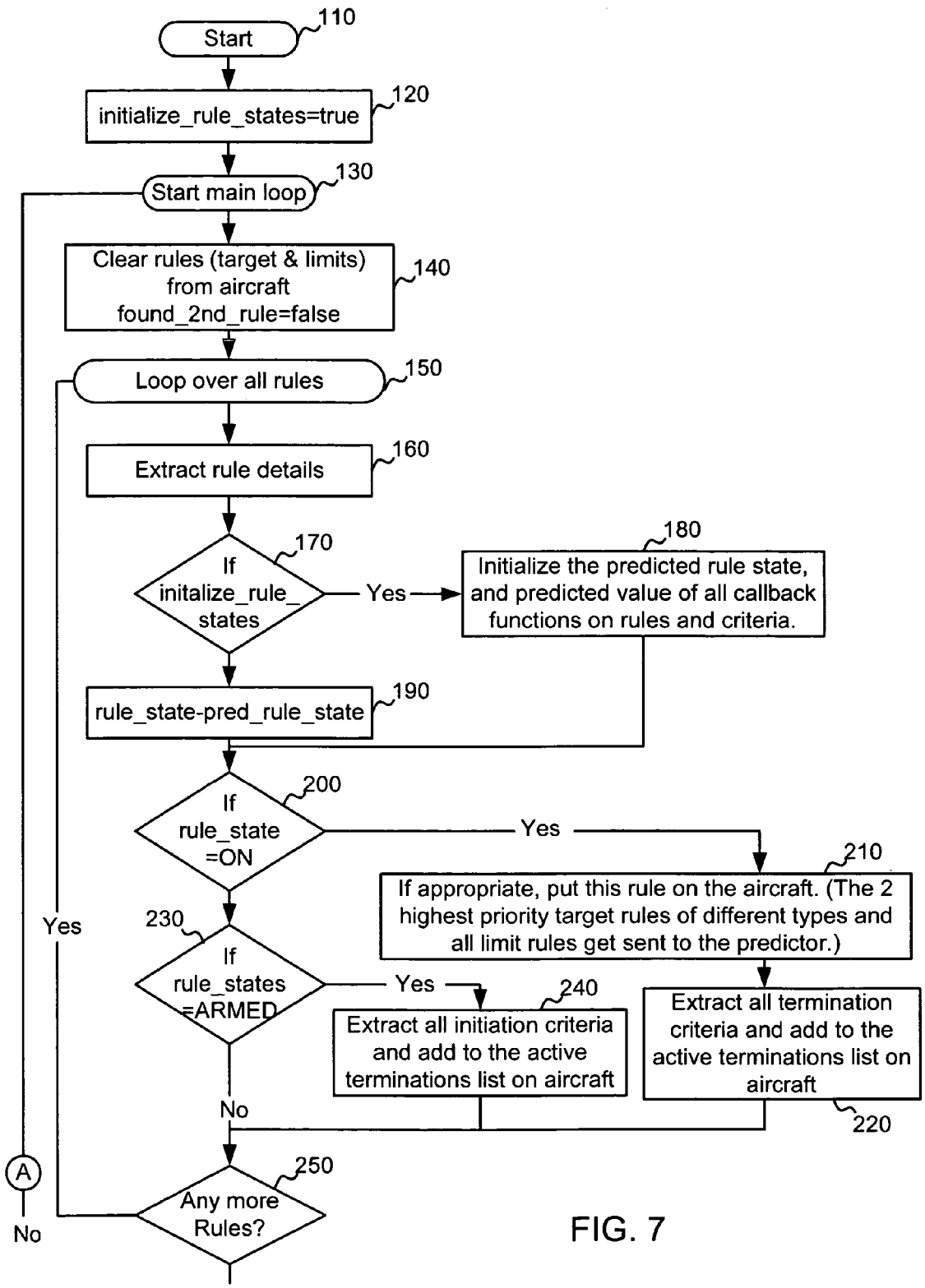
FIG. 7 is a flow chart corresponding to vertical flight planning according to an embodiment of the present invention.
Figure 7:
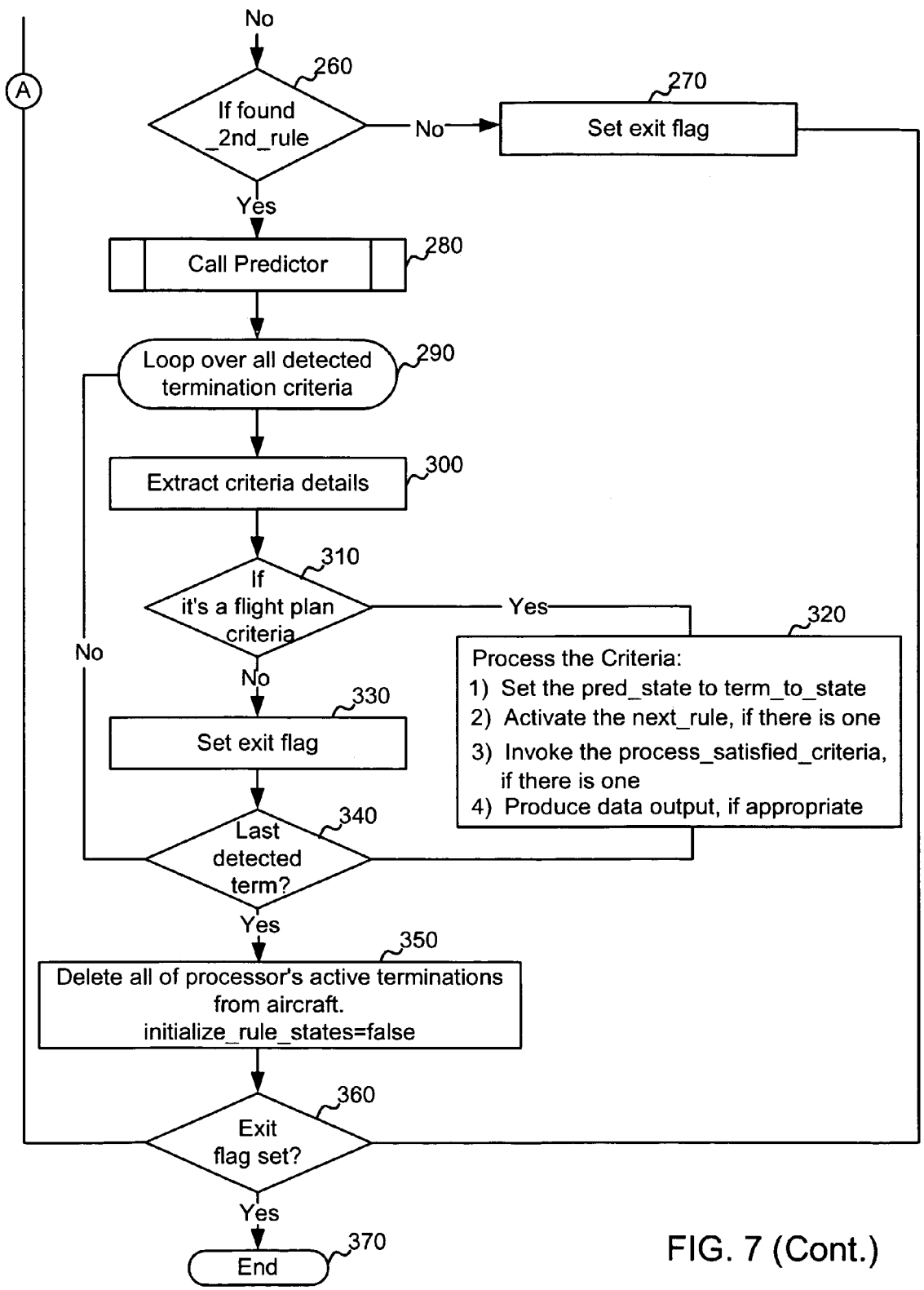

FIG. 7 is a flow chart illustrating how the rules are processed to assist in controlling the aircraft and computing performance predictions. The process begins at step 110 and moves on to step 120 where a variable is set to cause the rule states to be later initialized at step 180. Next at 130, the processor begins the main loop through the rules in the vertical flight plan. Once the main loop is started, at step 140, targets and limits are cleared from previous passes through the main loop.

Next, at step 150 a loop begins to review all of the rules. Rule details are extracted at step 160 and the state of each rule is analyzed at step 170. If the rule state needs to be initialized, then the rule state, along with predicted values of callback functions on rules and criteria are initialized. If step 170 is false, then the rule state is set to the predicted rule state at step 190. Next, each rule is evaluated to determine if its state is ON, ARMED or OFF. If, at step 200, a rule is determined to be ON, the processor determines if the rule should be passed to the aircraft predictor at step 210. (The highest priority speed, vertical path, and thrust target rules, along with all limit rules are passed to the predictor.)

Then at step 220, the termination criteria for the rule that is ON is extracted and added to the active criteria list. If a rule is determined not to be ON, then it is analyzed to see if the rule is ARMED at step 230. If the rule is ARMED, then the initiation criteria are extracted at step 240 and added to the active criteria list on the aircraft predictor. At step 250, the processor determines if there are more rules to be analyzed and if so, the process for each additional rule begins again at step 150.

If all rules have been analyzed then the process moves on to step 260 where it is determined whether at least two rules to control the aircraft have been found. If not, an exit flag is set at step 270 and the process moves to termination. If two rules are found at step 260, then the aircraft predictor is called to perform the predictions at step 280. The predictor evaluates the set of rules given to it and determines the appropriate method to use to integrate the aircraft equations of motion to predict the aircraft motion and it stops when one or more of the criteria given to it are met. A list of the detected criteria is then returned to the processor.

After control is returned to the processor, it determines what actions need to be taken associated with the detected criteria. At step 290, a loop begins to review all detected criteria. At step 300, the details of the detected criterion are extracted. Then, at step 310, the predictor determines if the criterion is related to the vertical flight plan. At step 320, the processor sets the state of the rules associated with the criterion to the states specified in the criterion definition. If a specific criterion specifies a "Next Rule", then the state of that rule is set to ON. If the criterion specifies an action that needs to occur in the form of a process-satisfied criteria function, then that function is invoked. Lastly, if the criterion specifies that output needs to be generated, then the aircraft states are written to an output point. If, at step 310, a criterion is found that is not owned by the vertical flight plan, the exit flag is set at step 330.

After taking the actions specified by the detected terminations and determining that it has reached the last detected term at step 340, the processor clears the rules and criteria from the aircraft at step 350. If the exit flag is not set at step 360, the processor returns to the start of the loop to re-evaluate the vertical flight plan. The processor reaches the end of the process at step 370 when a criterion is met that is not associated with the flight plan rules, i.e., a criterion that specifies an exit condition, e.g., reaching the destination.

Figure 8:
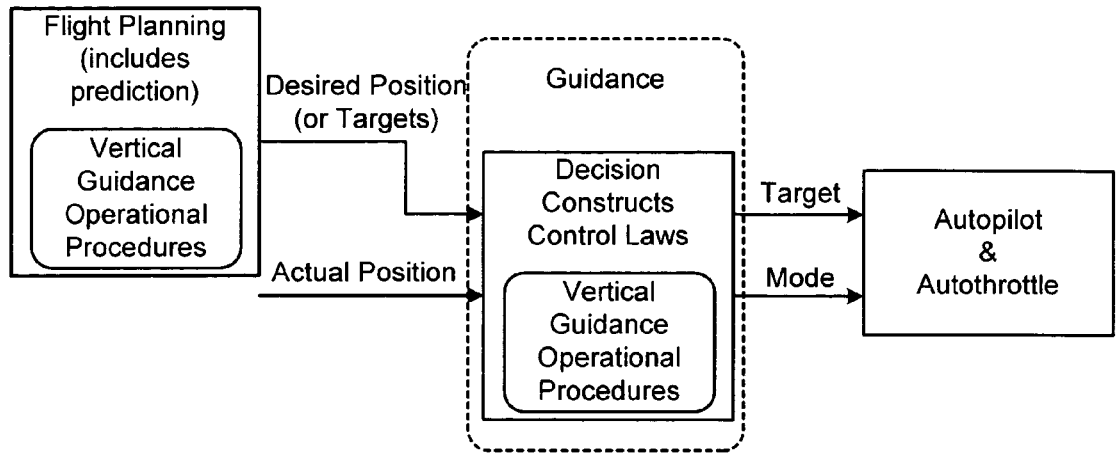
FIG. 8 illustrates how a vertical flight plan rules database and associated processor operate in conjunction to assist in the operation of an airborne vehicle.

FIG. 8 depicts a prior art flight system. In the prior art systems, the vertical guidance operational procedures are integrated with both the flight planning and guidance systems. With the operational procedures so intertwined with the rest of the system, changing guidance and planning criteria can be a monumental programming task requiring reprogramming of how the procedures interact with each of the systems.

In contrast, in accordance with the present invention, by having a separate rules database programmed to interact with the prediction and guidance systems, the rules may be easily altered and improved as time goes on without creating a need for modification of the prediction and guidance systems.

Figure 9:
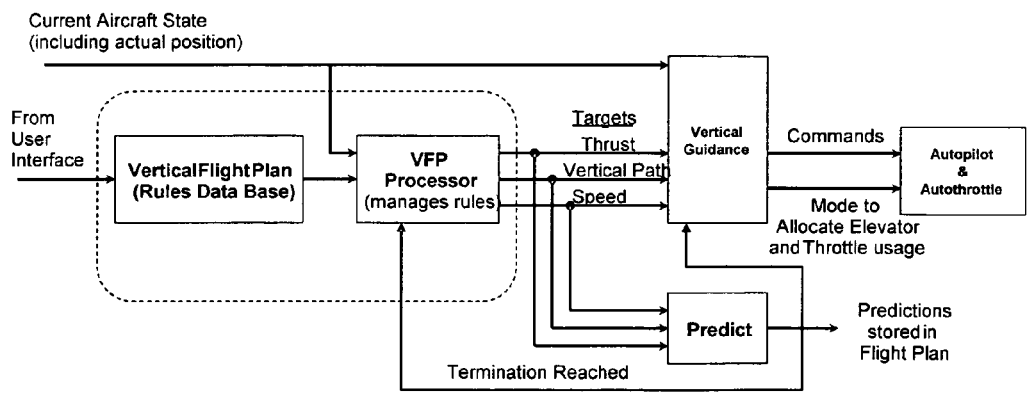
FIG. 9 depicts how the vertical flight plan and associated processor fit within an aircraft operating system.

FIG. 9 depicts how the vertical flight plan and associated processor of the present invention fit within an aircraft operating system, and also how the current system is more modular and adaptable than prior art systems. As shown, a user inputs rules into the database. The rules and the aircraft state are then fed into the processor to affect operation of the aircraft or, in a planning mode, the prediction of the flight path. The processor checks the aircraft state versus the rules and adjusts operation of target parameters such as thrust, vertical path, speed, etc. accordingly. The vertical guidance and prediction systems also provide feedback to the processor so that the processor knows when certain termination criteria have been met and thus knows that certain rules may be terminated or initiated.

This vertical flight planning system provides a new and improved method for representing a vertical trajectory. The approach generalizes the types and characteristics of vertical trajectories that may be modeled in an FMS for the purposes of computing performance predictions. This vertical flight planning structure may represent the types of trajectories used today as well as modeling new types not currently capable of being modeled with today's FMSs. In addition, although the present disclosure discusses embodiments of the present invention with respect to the vertical flight plan, one of ordinary skill in the art will appreciate that the same or similar principles as described herein could also be applied to manipulate or produce the lateral portion of a flight plan.

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A method for performing performance prediction with respect to a vertical flight plan of an aircraft, comprising:
   determining which vertical flight plan rules of a plurality of vertical flight rules that have been loaded in a predictions processor are active by monitoring for criteria that are used to initiate or terminate one or more of the vertical flight plan rules;
   predicting aircraft state at waypoints along a lateral flight path in view of active vertical flight plan rules; and
   updating the predicted aircraft state within an integrated flight plan database that stores prediction performance data associated with the aircraft's flight.

2. The method of claim 1, wherein the aircraft state comprises at least one of time, fuel, speed, altitude, distance, and flight path angle.

3. The method of claim 1, wherein a predictions processor is employed to predict aircraft state.

4. The method of claim 1, further comprising computing a time of flight based on the vertical flight plan.

5. The method of claim 1, further comprising predicting fuel consumption based on the vertical flight plan.

6. The method of claim 1, wherein the vertical flight plan comprises a cruise-climb segment.

7. The method of claim 1, wherein the vertical flight plan comprises a noise abatement procedure.

8. The method of claim 1, wherein the vertical flight plan comprises multiple climb, cruise and descent segments.

9. The method of claim 1, wherein the vertical flight plan comprises multiple required time of arrival constraints.

10. A method for performing performance prediction with respect to a vertical flight plan of an aircraft, comprising:
    specifying a vertical flight plan comprising rules, the rules having associated initiation and termination criteria;
    processing the vertical flight plan for specified state data to determine whether a rule is armed, on, or off; and
    predicting future motion of the aircraft operating according to the vertical flight plan.

11. The method of claim 10, wherein the specified state data comprise at least one of time, fuel, speed, altitude, distance, and flight path angle.

12. The method of claim 10, wherein predicting future motion is performed by a predictions processor.

13. The method of claim 10, further comprising computing a time of flight based on the vertical flight plan.

14. The method of claim 10, further comprising predicting fuel consumption based on the vertical flight plan.

15. The method of claim 10, wherein the vertical flight plan comprises a cruise-climb segment.

16. The method of claim 10, wherein the vertical flight plan comprises a noise abatement procedure.

17. The method of claim 10, wherein the vertical flight plan comprises multiple climb, cruise, and descent segments.

18. The method of claim 10, wherein the vertical flight plan comprises multiple required time of arrival constraints.

19. The method of claim 10, further comprising controlling motion of the aircraft in accordance with the flight plan.

20. In an aircraft having a computer system to control the aircraft, an apparatus for generating commanded control modes, comprising:
   means for specifying a vertical flight plan comprising rules for controlling aircraft operation, the rules having related initiation and termination criteria;
   means for processing the vertical flight plan for specified state data to determine which rules are active; and
   means for predicting future motion of the aircraft in accordance with the vertical flight plan.

21. The apparatus of claim 20, further comprising means for controlling the motion of the aircraft in accordance with the vertical flight plan.

22. The system of claim 20, wherein the specified state data comprise at least one of time, fuel, speed, altitude, distance, and flight path angle.

23. The system of claim 20, wherein predicting future motion is performed by a predictions processor.

24. The system of claim 20, wherein the system computes a time of flight based on the vertical flight plan.

25. The system of claim 20, wherein the system predicts fuel consumption based on the vertical flight plan.

26. The system of claim 20, wherein the vertical flight plan comprises a cruise-climb segment.

27. The system of claim 20, wherein the vertical flight plan comprises a noise abatement procedure.

28. The system of claim 20, wherein the vertical flight plan comprises multiple climb, cruise and descent segments.

29. The system of claim 20, wherein the vertical flight plan comprises multiple required time of arrival constraints.

30. The system of claim 20, wherein the system controls motion of the aircraft in accordance with the flight plan.

* * * * *